Figure 1:
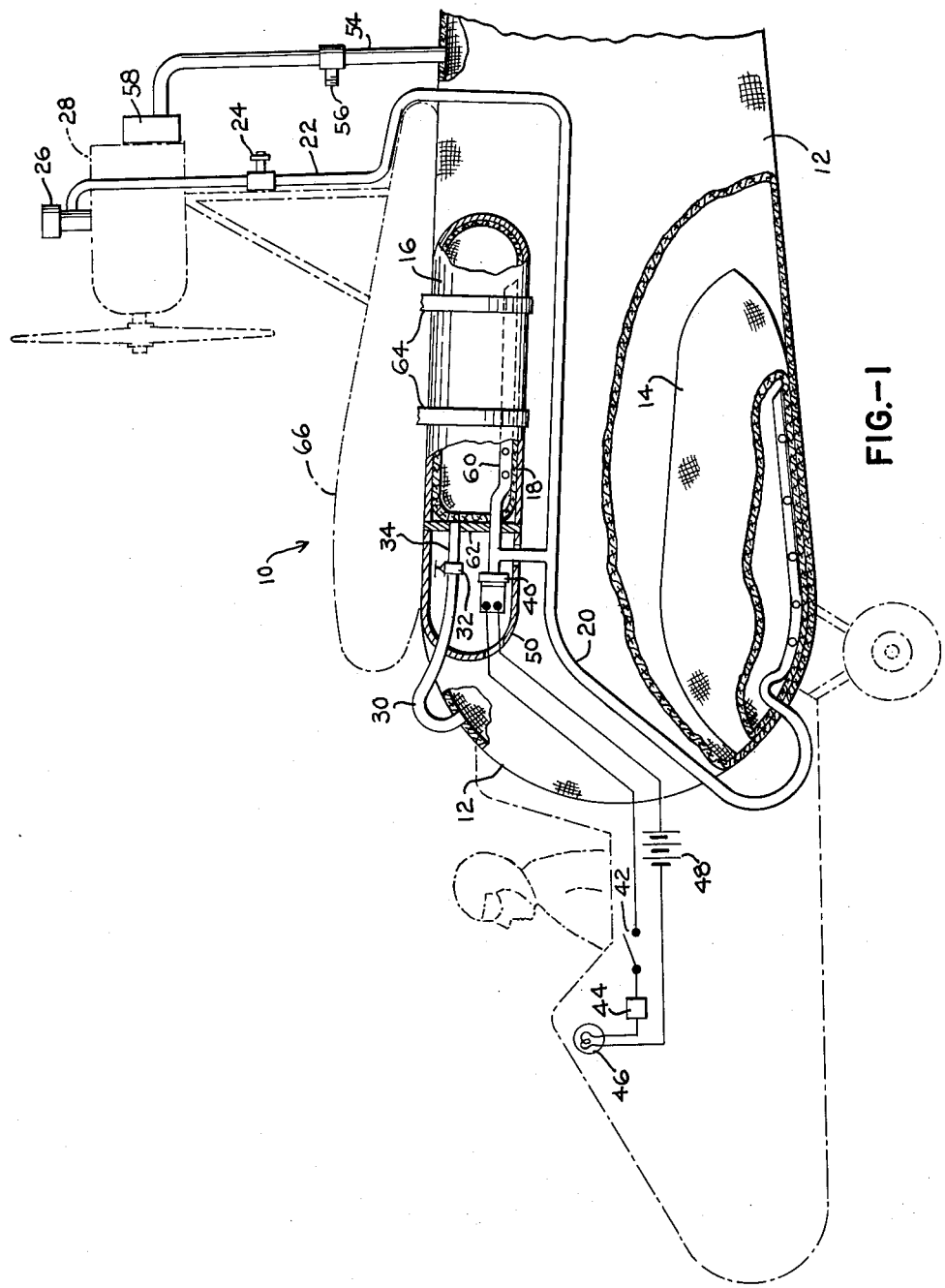

June 9, 1964 R. H. ERLANGER ETAL 3,136,507
AUTOMATIC AUXILIARY FUEL SYSTEM
Filed June 27, 1962

INVENTORS.
RALPH H. ERLANGER
BY JOHN W. PHILLIPS

*Louis Sheldon*
ATTORNEY 3,136,507
AUTOMATIC AUXILIARY FUEL SYSTEM
Ralph H. Erlanger, Cleveland, and John W. Phillips, North Canton, Ohio, assignors, by mesne assignments, to the United States of America as represented by the Secretary of the Navy
Filed June 27, 1962, Ser. No. 205,810
12 Claims. (Cl. 244—135)

This invention relates to fuel systems and is concerned more particularly with a low fuel warning system adaptable to an airplane which is at least in part of inflatable construction.

The inflated type of aircraft heretofore has been provided with but one liquid fuel tank or cell. The cell is collapsible and mounted in the inflatable fuselage and externally pressurized by the fuselage inflation air pressure to force fuel into the engine carburetor, thus obviating the necessity for a fuel pump as such.

It would be desirable, and it is an object of the invention, to provide the pilot, at the time most of his fuel has been consumed, with a warning that there remains a predetermined residual fuel supply which at a specified engine power setting is translatable as remaining useful flight time sufficient to enable the pilot to execute proper termination of the flight. Because of the difficulty of direct fuel level measurement of an externally pressurized collapsible fuel cell, this desirable objective has not heretofore been achieved. On exhaustion of the fuel in the cell of the conventional inflated airplane fuel system, the cell material collapses at and thereby plugs the top of the fuel outlet, causing an abrupt shut-off or "pinch-off" of fuel, whereupon the only additional fuel available for the engine is a portion of the fuel remaining in the carburetor float bowl, said portion being equivalent to a fraction of a minute of running time, ordinarily insufficient to enable the pilot effectively to execute termination of the flight. Moreover, with a two-cycle engine and the small diameter propeller used in present airplanes of the inflatable type, air-restarts by diving and "windmilling" the engine would be impossible even if an auxiliary manually controlled fuel supply were available.

It is also an object to achieve the foregoing objective without interruption of fuel flow to the engine.

A further object is to provide a fuel system including an auxiliary fuel supply which automatically starts flowing to the engine on exhaustion of the main fuel supply.

Another object is to provide main and auxiliary fuel supplies in a system which insures filling of the auxiliary supply before filling of the main supply.

An additional object is to employ the same air pressure supply to collapse the main and auxiliary fuel cells.

A further object is to provide a fuel system of the character noted which is compact and of light weight.

Other objects, advantages and novel features of the invention will become apparent from the following detailed description of the invention when considered in conjunction with the accompanying drawing, wherein the figure is a more or less schematic view of an inflated airplane fuel system embodying features of the invention.

Referring now more particularly to the drawing, there is shown at 10 an aircraft of the inflatable type including an inflatable collapsible main compartment such as the fuselage 12, containing a main collapsible fuel tank or cell 14, and an auxiliary compartment such as a rigid housing 16 containing an auxiliary collapsible fuel tank or cell 18. A fuel line 20 extends between and is secured to the cells 14 and 18, and a fuel outlet such as the fuel line 22, provided with a fueling fitting 24, extends from the fuel line 20 to the carburetor 26 of the aircraft's internal combustion engine 28. An air line 30 connects the inlet or high pressure side of an air pressure regulator 32 to the fuselage 12 outside of the main cell 14, and an air line 34 connects the outlet or low pressure side of the regulator to the housing 16 outside of the auxiliary cell 18.

The fuel line 20 communicates with the casing of an electric liquid fuel pressure switch 40 connected in series with a manual on-off switch 42, a flasher 44, a pilot indicator light 46 located on the pilot's instrument panel or elsewhere in the cockpit, and a dry cell battery 48.

The regulator 32, switches 40 and 42, flasher 44 and light 46 may be of conventional design.

A preferably rigid cap 50 may be attached to the housing 16 to contain and protect the regulator 32 and pressure switch 40.

Unless otherwise specified or apparent, the air and fuel pressures given or referred to herein are to be understood as being positive or gauge, i.e., above-atmospheric, pressures.

Assume the pressure regulator 32 is set to open at a differential of 3 p.s.i., so that, with a sustained fuselage inflation pressure, of say, 7 p.s.i., the housing air will be at a pressure of 4 p.s.i. The regulator 32 is of the self-relieving type having a relief valve which, on any tendency of the housing air pressure to exceed 4 p.s.i., will vent housing air to the atmosphere to maintain the p.s.i. minimum pressure differential.

The fuel pressure switch 40 is preferably set to close when the fuel pressure in the switch casing is less than about ½ to 1 p.s.i. above the pressure regulator setting, i.e., when the fuel pressure in the switch casing is below a critical value of about 4½ to 5 p.s.i. in the circumstances noted above.

Prior to flight the manual switch 42 is preferably off to avoid needless operation of the warning light 46.

Inflation of the fuselage 12 and other inflatable parts of the airplane 10 may be initially accomplished by a hand pump, cartridge, or ground air compressor (not shown). The drawing shows only the arrangement for inflating the fuselage 10. To this end, an air line 54 extends from the fuselage 12 and is equipped with an air inlet fitting 56 for detachably receiving the hand pump, cartridge, or ground compressor nozzle. The air line 54 continues to an air compressor 58, which is a normal part of the airplane 10, and is run by the engine 28 after the nozzle is detached, and maintains the fuselage 12 (and other inflatable parts) at the proper inflation pressure throughout the flight.

Assuming the aircraft 10 is inflated by the hand pump, cartridge, or ground air compressor and ready for fueling, with the cells 14 and 18 collapsed at substantially zero effective volume when the fueling fitting 24 is open to atmospheric pressure, liquid fuel is introduced through the fueling fitting. The housing air pressure being below the fuselage air pressure, due to the operation of the regulator 32, the auxiliary cell 18 will of course fill first. As the auxiliary cell 18 proceeds to fill and thus tend to compress the air in the housing 16, the self-relieving pressure regulator 32 will vent housing air to the atmosphere as noted above, allowing the cell to line the housing wall, as shown. Immediately on completion of the filling of the auxiliary cell 18, the continuing supply of fuel will proceed to fill the main cell 14, and fueling is terminated preferably when the main cell contains a predetermined metered amount of fuel.

When the pilot now starts the engine 28, the compressor 58 operates to bring the fuselage pressure to 7 p.s.i., which then is the pressure on the fuel throughout the fuel system.

When the pilot opens the throttle, the fuselage air pressure, being greater than the housing air pressure, forces fuel from the main cell 14 to the carburetor, the auxiliary cell 18, by reason of the lower ambient air pressure, remaining full until the main cell is completely exhausted of fuel and hence collapsed over its outlet 52. This cessation of supply from the main cell 14 is abrupt, caused by the sudden closing of the fuel line end 60 by the collapsed material of the cell. As soon as flow from the cell 14 stops, the remaining fuel supply is no longer subject to the fuselage air pressure, but rather is subject to the housing air pressure. During this transitory, practically instantaneous, fuel pressure drop the fuel pressure on the switch 40 falls sufficiently to insure closing of the switch, which will remain closed. The pilot will of course have previously closed the manual switch 42, so that, the fuel pressure switch 40 now being closed, the light 46 will start flashing, thereby warning the pilot that this main fuel supply is exhausted and that he has a predetermined running time left in which to execute proper flight termination.

Coincidentally with shut-off of the main fuel supply, fuel automatically commence to flow from the auxiliary cell 18 and continues until the cell is exhausted.

It is apparent from the foregoing that with this system there is no interruption in fuel supply to the engine, and the pilot is warned automatically at inception of changeover of supply from main cell to auxiliary cell and thus knows he has sufficient time in which to execute proper flight termination.

Although the auxiliary cell 18 may be of any desired capacity within the limitations of an aircraft of the inflatable type, a capacity of about 1.1 gallons should generally suffice. With this capacity, the housing 16 and attached cap 50 made with an overall length of about 20½ inches and a diameter of about 5½ inches would be suitable, and the invention would add only about 5 pounds to the dry weight of the present single fuel cell equipped inflatable airplane.

Major advantages of an inflatable aircraft are low cost, low weight, capable of being collapsed to a compact form so as to be transported easily by one or two men on foot, on the airplane wheel structure, on a dolly, or on a small motorized vehicle such as the so-called "army mule." It is important that auxiliary equipment be simplified and held down in weight for minimum addition to the load to be driven in flight as well as for ease in transportation of the collapsed airplane. It is thus apparent that the invention lends itself particularly to use in an inflatable type airplane, which usually weighs about 250 pounds dry, although the invention is capable of more general application.

The housing 16 may be rigid or, like the fuselage, may be collapsible and unstretchable, except for the wall 62, which is rigid. The cap 50 is preferably rigid.

The structure comprising the housing 16 and cap 50 would be mounted in any suitable place; as shown, this structure is mounted in a sling arrangement 64 secured to a wing 66.

The tank 14 is preferably made of a flexible unstretchable rubber-impregnated fabric. The tank 18 may be made likewise and, in that event, when full, may be spaced from but preferably lines the housing. The tank 18 could be made of an elastic, in which event it is preferably made of a rest; i.e. unstressed, size and shape such that it will be substantially unstressed when lining the housing; thus any pressure on the contained fuel exerted by the tank in resuming its rest condition will not materially add to the pressure exerted on the fuel by the air in the housing.

The main cell 14 usually filled to a metered volume of about 20 gallons of fuel, the cruising speed of an inflatable airplane is about 70 m.p.h. It travels about 20 miles per gallon, so that the auxiliary fuel supply noted above will ordinarily afford the pilot ample time in which to execute proper flight termination.

The pressure switch 32 opens as soon as fueling starts, inasmuch as the fuel pressure exceeds the pressure at or below which the pressure switch can close.

Should the fuselage inflation pressure, prior to exhaustion of the main fuel supply, drop to a level at which the pressure switch 40 closes, the light 46 will alert him of that fact so that he can take timely steps to remedy the situation or prepare to land.

Obviously many modifications and variations of the present invention are possible in the light of the above teachings. It is therefore to be understod that within the scope of the appended claims the invention may be practiced other than as specifically described.

We claim:
1. In an inflatable airplane having an internal combustion engine,
   an inflatable fuselage inflated at a predetermined constant air pressure;
   a compartment carried by the airplane;
   an air pressure regulator communicating at its inlet with the fuselage and at its outlet with the compartment;
   a main fuel tank in the fuselage;
   an auxiliary fuel tank in the compartment and having a capacity translatable into a period of running time of the engine, at a given engine power setting, sufficient to enable the pilot to properly execute flight termination;
   a fuel line extending from the main tank to the auxiliary tank;
   a fuel outlet extending from the fuel line to the engine;
   the main tank being collapsible on exhaustion of its contents, and, on complete collapse, plugging the adjacent end of the fuel line, whereupon the auxiliary tank undergoes a pressure drop from the pressure in the fuselage to the pressure at the regulator outlet;
   and signaling means including a fuel pressure switch communicating with the fuel line and actuatable in response to the pressure drop.

2. In a fuel system for an engine;
   a main compartment inflated at a predetermined pressure;
   an auxiliary compartment;
   an air pressure regulator connected at its inlet and outlet to the main and auxiliary compartments, respectively;
   a collapsible main fuel tank in the main compartment;
   a collapsible auxiliary fuel tank in the auxiliary compartment and having a capacity translatable into a predetermined period of time of running of the engine;
   a fuel line connecting the main tank to auxiliary tank and having an outlet;
   the main fuel tank on complete collapse closing the fuel line thereat;
   a fueling fitting connected to the fuel outlet;
   and signaling means including a fuel pressure switch in the fuel line and actuatable in response to complete collapse of the main fuel tank;
   whereby all of the fuel in the main tank will be exhausted therefrom before any fuel is discharged from the auxiliary tank, and discharge of fuel from the auxiliary tank will commence, and the switch will actuate, immediately pursuant to collapse of the main tank.

3. In a fuel system,
   a main compartment inflated at constant pressure;
   an auxiliary compartment;
   a self-relieving air pressure regulator connected at its inlet and outlet respectively to the main and auxiliary compartments;
   main and auxiliary collapsible fuel tanks in the respective compartments;
   a fuel line connecting the tanks;
   and a fuel outlet connected to the fuel line and connectable to an internal combustion engine;
   the main tank on complete collapse isolating the fuel in the auxiliary tank from the pressure in the main tank;
whereby the auxiliary tank will start to discharge when the main tank becomes collapsed.

4. The structure of claim 3, and a fueling fitting connected to the fuel line, whereby the main tank will start to fill when the auxiliary tank becomes full.

5. The structure of claim 3, and means responsive to complete collapse of the main tank for signaling inception of fuel flow from the auxiliary tank.

6. The structure of claim 3, the auxiliary tank comprising an elastomeric bladder expansible to the auxiliary compartment wall.

7. The structure of claim 3, and warning means including a fuel pressure switch hydraulically connected to the fuel line and actuatable in response to collapse of the main tank.

8. In a fuel system,
a main compartment;
an auxiliary compartment;
means for maintaining the main compartment at a predetermined inflation pressure and the auxiliary compartment at a lower predetermined inflation pressure;
collapsible main and auxiliary fuel tanks in the respective compartments;
a fuel line connecting the tanks;
a fuel outlet connected to the line;
and a fueling fitting connected to the line.

9. The structure of claim 8, and means responsive to complete collapse of the main tank for signaling such collapse.

10. The structure of claim 8, and means including a fuel pressure switch connected to the line and responsive to the drop in fuel pressure resulting from collapse of the main tank for signaling such collapse.

11. In a fuel system for an engine:
a collapsible main fuel tank;
means for maintaining said main tank under a positive constant first pressure;
a collapsible auxiliary fuel tank;
means for maintaining said auxiliary tank under a positive constant second pressure;
a fuel line connecting the main tank and the auxiliary tank to the engine,
said first pressure being greater than said second pressure;
whereby all fuel is discharged from the main tank prior to any discharge of fuel from the auxiliary tank.

12. In a fuel system for an engine:
a collapsible main fuel tank;
means for maintaining said tank under a positive first pressure;
a collapsible auxiliary fuel tank;
means for maintaining said auxiliary tank under a positive second pressure;
a fuel line connecting the main tank and the auxiliary tank to the engine;
said first pressure being greater than said second pressure;
whereby fuel is discharged only from the main tank under the influence of said first pressure;
and means automatically responsive to completion of discharge of fuel from the main tank for initiating discharge of fuel from the auxiliary tank under the second pressure.

References Cited in the file of this patent
UNITED STATES PATENTS

| | | |
|---|---|---|
| 2,146,729 | Gavin | Feb. 14, 1939 |
| 2,170,136 | Gavin | Aug. 22, 1939 |
| 2,450,954 | Hall | Oct. 12, 1948 |
| 2,867,395 | Saint | Jan. 6, 1959 |
| 2,941,762 | Blair | June 21, 1960 |
| 3,014,474 | Banker | Dec. 26, 1961 |